A. W. H. LENDERS.
METHOD OF MANUFACTURING DEXTRINS, GUMS, AND MODIFIED STARCHES.
APPLICATION FILED JULY 5, 1917.
1,305,291. Patented June 3, 1919.
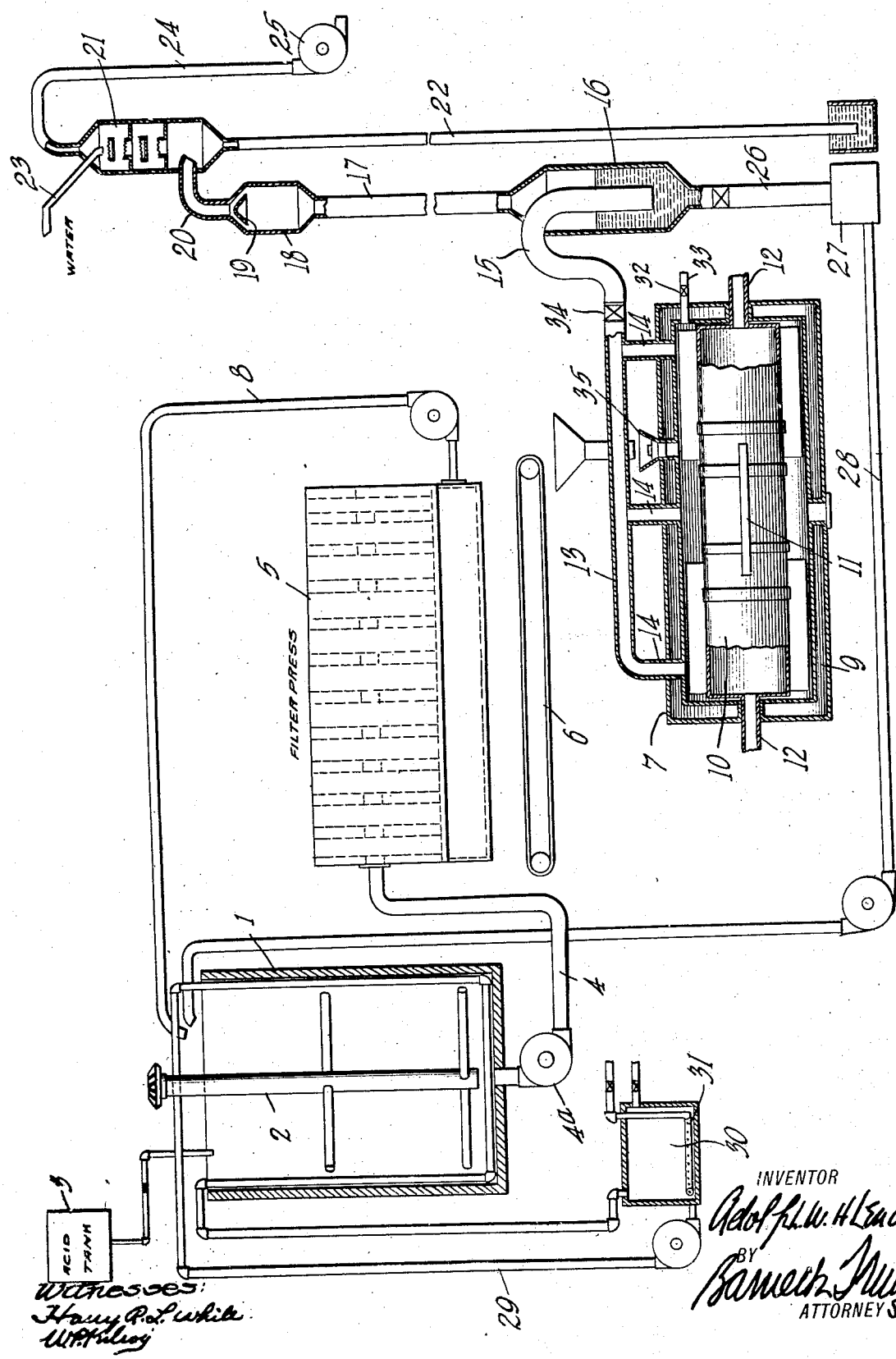

UNITED STATES PATENT OFFICE.

ADOLPH W. H. LENDERS, OF CEDAR RAPIDS, IOWA, ASSIGNOR TO DOUGLAS COMPANY, OF CEDAR RAPIDS, IOWA, A CORPORATION OF DELAWARE.

METHOD OF MANUFACTURING DEXTRINS, GUMS, AND MODIFIED STARCHES.

1,305,291.  Specification of Letters Patent.  Patented June 3, 1919.

Application filed July 5, 1917. Serial No. 178,733.

*To all whom it may concern:*

Be it known that I, ADOLPH W. H. LENDERS, a citizen of the United States, residing at Cedar Rapids, in the county of Linn and State of Iowa, have invented certain new and useful Improvements in Methods of Manufacturing Dextrins, Gums, and Modified Starches, of which the following is a specification.

My invention relates to a novel method of making dextrins, British gum, thin boiling starch and other modified starch products. According to the usual methods, dextrin, for example, is manufactured by mixing powdered starch with nitric or hydrochloric acid sufficient to merely dampen it and subjecting the acidulated starch to a roasting operation. This operation is continued until the material is dextrinized or until approximately the desired degree of dextrinization is obtained. The methods of making this product, as heretofore practised, are subject to several objections. It has always been difficult to obtain a complete dextrinization of the starch, when complete dextrinization is desired, or, when a partial dextrinization is wanted, to give the material just such treatment as will produce the desired degree of dextrinization. It has also been difficult to produce a homogeneous product free from specks and lumps; and this is particularly so where complete dextrinization is sought. These difficulties are due, in large part, to the practical impossibility of obtaining a perfect distribution of the acid throughout the starch and a uniform heating of the entire batch. A pure, homogeneous product free from charred specks and from lumps or particles of raw or only partially dextrinized starch, is conditioned upon having the starch particles acidulated to an equal extent throughout the batch; and this is a matter of some difficulty.

It has also been considered impossible to make dextrin of first class quality in large quantities. I know of no process heretofore employed which will give a satisfactory product when there is more than twenty-five hundred pounds of starch in a batch.

My invention provides a quite radically novel method of manufacturing dextrins by which it is possible to produce a perfectly homogeneous and pure product. If desired, the starch may be completely dextrinized, or the dextrinization carried to any desired point. There is, furthermore, practically no limit to the size of the batch except that imposed by mechanical considerations in the handling of the material. In addition to making a highly soluble, white dextrin, this process may be employed for the manufacture of any of the commercial grades or types of dextrin of varying solubilities and colors, as well as gums, which latter are made without the use of acid.

According to the methods heretofore used in the manufacture of dextrins and similar products, the material as it comes from the dextrinizing vessel contains little or no moisture. In this state it is hygroscopic and will absorb from the air moisture to the extent of about twelve per cent. of its weight, more or less, and this percentage of moisture is standard for starch products. The manufacturer, therefore, purposes, ordinarily, to keep the product in condition where it will be exposed to the air until it has absorbed the allowed percentage of moisture. My improved method, by proper regulation of the instrumentalities used for carrying it out, will produce a product containing any desired degree of moisture. The material will never, throughout the process, reach a condition in which it will contain less water than the percentage customary in the commercial product.

This feature also has the advantage of making the manufacturing process more safe. Dangerous explosions in starch factories have occasionally been traceable to dextrin dust in the atmosphere or in the mixing apparatus.

A further object of the invention is to provide a method of manufacturing dextrins and similar products that will use starch from the starch tables instead of dry starch. The advantage of this is that one step in the process—that is, considering the manufacture of the starch and of the dextrin or other product as a single continuous process—is entirely eliminated.

The process can also be used to advantage in the manufacture of products commonly called modified starches in which the hydrolyzation of the starch is not carried as far as dextrinization. For such products the final treatment necessary to dextrinize the starch is omitted. The usual way of making modified starches is to mix the starch with relatively large volumes of water to make a starch milk, then modify by cooking, and afterward evaporate the water from the product. The disadvantage of this method resides in the fact that the starch after it has been modified, is in a liquid state and the evaporization of the water therefrom involves another handling of the product and is more or less costly. Starch cannot be dextrinized by the usual methods of making modified starches even when the cooking is under considerable pressure because of the rapidity with which conversion into sugar will take place under these conditions. In other words, it is not practical to make dextrin according to the method usually employed for conversion into sugar.

My invention provides a method which can be used for making either dextrin or modified starch or any intermediate product. In any case, the hydrolyzation of the starch and the drying thereof proceed simultaneously with the result that the product of the operation contains, approximately at least, the amount of moisture customary for marketable products of these types and no more. Under the old methods dextrin comes from the process in too dry a state, while modified starches contain a very great excess of water.

My novel method has other advantages, as will appear from the following description.

It will be understood that the theoretical lines of demarcation between the different products here concerned, dextrins, gums and modified starches are not maintained with any degree of accuracy in actual practice. Commercial dextrin may contain raw starch or starch which is merely modified short of dextrinization; and, in fact, in certain grades of dextrin complete dextrinization, so that the product is wholly soluble in water, is not desired. On the other hand, products known as modified starches may and frequently do contain some dextrin. In describing my process as applied to the manufacture of these several products, the terms "dextrin," "gum" and "modified starches" will be used in the general sense in which they are employed commercially.

The drawing illustrates diagrammatically, in side elevation with parts in section, a suitable apparatus for practising the method of my invention. It will be understood, however, that the invention is by no means limited to the use of this particular form of apparatus.

Raw starch, for example, starch taken directly from the starch tables (dried starch might be used), is mixed with water and an acid, such as nitric, sulfuric or hydrochloric acid, in a mixing vessel 1 provided preferably with an agitator 2. 3 represents the acid supply tank. After the starch, acid and water have been thoroughly mixed in the mixing vessel 1 so that the entire body of starch is acidulated uniformly, the starch milk is run or pumped through a pipe 4 into a filter press 5 which removes a large part of the liquid content leaving the starch in a moist but solid or semi-solid condition. In this form it is delivered by means of a conveyer 6, or other suitable means, into the modifying vessel 7 where it is heated in a vacuum. The acid water pressed from the starch by the filter press may be returned to the mixing tank through pipe 8 and used with the next batch of starch.

The modifying vessel 7 is constructed with a steam jacket 9 and contains preferably a hollow, revoluble drum 10 provided with agitating paddles 11. Steam is admitted into the steam jacket 9 and into the interior of the drum, the latter being provided for this purpose preferably with hollow trunnions 12. At the same time the air and the vapors developed by heating the starch are exhausted from the space containing the starch. The starch from the press will ordinarily contain about forty-five per cent. of moisture. Any other method than the one described might be employed for acidulating the starch and giving it a moisture content of about this percentage, which, it will be understood, is about that of starch from the starch tables. The heating in vacuo is continued, preferably, until the moisture has been reduced to about fourteen per cent. Under these conditions the vacuum should not be substantially less than twenty-five inches, measured on a mercury scale; otherwise the starch will gelatinize, although the pressure in the vessel may, if desired, be increased after a certain amount of the moisture has been removed from the starch.

In the drawings, 13 represents an exhaust pipe having branches 14 leading from the interior of the dextrinizing vessel. The exhaust pipe is preferably provided with a U-shaped bend 15 which enters a vessel 16 below the level of liquid in said vessel. Arranged above vessel 16, and connected therewith by a riser 17, is a vessel 18 provided with a baffle plate 19. A pipe 20 extends from the top of vessel 18 into the condensing vessel 21 of a barometric condenser of familiar type, the water leg of which is indicated at 22. 23 is a water pipe projecting into the upper end of the condensing chamber and 24 is a pipe leading from the condensing chamber to the vacuum pump 25. The purpose of vessels 16 and 18 is to intercept the starch particles which may be drawn from the modifying vessel by suction. Vessel 16 has a valved pipe 26 through which the accumulated starch liquor in the vessel may be drawn off into tank 27 and from there pumped through pipe 28 back into the mixing tank 1.

To obtain the best results in the pressing operation the starch milk should be at approximately one hundred degrees Fahrenheit. For this reason the tank 1 is heated, by any suitable means, for example, by a hot water circulating pipe 29, the water of which is heated in a heating device 30 by means of a perforated steam coil 31.

The heating of the starch in the vacuum in the presence of acid produces a modification of the starch but under ordinary conditions substantially no dextrinization. That is, the raw starch is changed into what is known as modified or thin boiling starch which chemically is starch and not dextrin. However, a certain amount of dextrinization may be produced incidentally in this operation and, in fact, can be produced intentionally by using an excess of acid; but the use of a large quantity of acid in this connection is inexpedient under ordinary circumstances as it involves the subsequent neutralization of the product.

One may obtain a modification of the starch, up to ninety degrees fluidity, and possibly further than this (measured on the fluidity scale familiar to those skilled in this art) by heating the acidulated starch in a vacuum as above described; but it is desirable, in case a product having the highest degree of fluidity obtainable is required, to change the method of treatment of the material after it has reached the stage of approximately ninety degrees fluidity. When this point is reached (the material having a moisture content of practically twelve to sixteen per cent.) the vacuum in the modifying vessel is broken by opening valve 32 in the relief pipe 33. The operation of the vacuum pump 25 is stopped at the same time. The heating of the material is continued under atmospheric pressure, or under steam pressure if desired, which can be accomplished by closing valves 32 and 34 in pipe 13, until test of the material under treatment shows the desired degree of fluidity. This further treatment, besides modifying the starch, will reduce its moisture content somewhat. If necessary to produce drying without over treatment the vapors may be allowed to freely escape as developed by opening the starch inlet 35.

It will be understood that in the making of modified starches of lower degrees of fluidity, the operation may be complete with the treatment of the material in the vacuum. The extent to which the heating in vacuo is carried, and also the amount of acid employed, will govern the degree to which the starch is modified.

The process above described has the advantage of economizing acid. A considerable portion of the acid originally introduced into the starch milk is recovered with the water from the filter pressing operation and is returned to the mixing tank and used over again. The ordinary methods of manufacturing modified starches involve neutralization of the product with consequent loss of all the acid put into the starch milk. My improved process also has the advantage of eliminating or facilitating the drying of the product (where a commercially dry product is required) as a separate operation performed subsequent to the modification of the starch. In accordance with my method of manufacture the product comes from the modifying vessel in a state approximating at least the commercially dry state.

If the product desired is one of the products known as dextrins or gums, the treatment in the vacuum will have to be followed by the subsequent heating under atmospheric pressure or developed steam pressure, provided anything like complete dextrinization of the starch is required. To make a dextrin having a maximum degree of solubility, for example, the starch is modified in the vacuum so as to have, upon test, as high a degree of fluidity as possible. The vacuum is then broken by opening valve 32 in the relief pipe 33 and the exhaust pump stopped. The application of heat is continued and the material is agitated by the revolution of drum 10. The vapors developed by this further treatment of the material to a large extent remain in the drum in contact with the starch. This treatment may be carried to a point at which the starch is converted entirely into dextrin. The product in such case will be practically soluble in water; or, by discontinuing the treatment at the appropriate points products having lesser degrees of solubility may be obtained. The dextrinization of the starch is accompanied necessarily by the expulsion of a certain amount of moisture so that by proper regulation of the apparatus a finished product may be made which will contain approximately the desired amount of moisture, that is, the amount of moisture which the ordinary commercial dextrin contains. The process of dextrinization may be hastened by creating a pressure inside the dextrinizing vessel by closing valves 32 and 34, but this is not essential.

It will be understood that the amount of acid also plays a part in the character of the product obtained under any given conditions of temperature and pressure. Furthermore, while in order to prevent gelatinization at such time as the starch contains a large amount of moisture, it is necessary to heat in a relatively high vacuum, it will be quite possible to reduce the intensity of the vacuum, with consequent increase of temperature, after a portion of the water has been removed from the starch, thereby increasing the rapidity of modification and also dextrinizing the starch, in part, during the first step of the process.

In view of these considerations, and in view of the fact that the process is adaptable to the production of a considerable variety of products differing in the degree of change to which the starch is subjected, it is impossible to lay down definitely any precise directions for the carrying out of the process. Something must be left to the discretion of the operator who will be governed by the character of the particular product desired. However, any one skilled in this art will be able from the above description to practise the process, varying operating conditions so as to produce the product having the particular characteristics desired.

While I have described the novel method in the manner which it is preferably practised, I wish it to be understood that the invention is not limited to the particulars set forth by way of preference, such as temperatures, percentage of moisture at different stages of the process, etc., as these details are subject to modification within the discretion of the skilled operator. By the term "starch product of the class specified" as used in the claims, I intend dextrin or some of the variously termed modifications of starch intermediate raw-starch and dextrin.

I claim:

1. Improvement in the method of manufacturing a starch product of the class specified, which consists in mixing starch with an acid in relatively large volumes of water to produce a starch milk, then reducing the material to a solid or semi-solid state by removal of a considerable portion of the water therefrom, and thereafter subjecting it to the modifying treatment.

2. Improvement in the method of manufacturing a starch product of the class specified, which consists in mixing starch with an acid in relatively large volumes of water to produce a starch milk, then pressing out a considerable portion of the water so as to reduce the material to a solid or semi-solid state, and thereafter subjecting it to the modifying treatment.

3. Improvement in the method of manufacturing a starch product of the class specified, which consists in mixing starch with an acid in relatively large volumes of water to produce a starch milk, heated to a temperature of approximately one hundred degrees Fahrenheit, then pressing out a considerable portion of the water so as to reduce the material to a solid or semi-solid state, and thereafter subjecting it to the modifying treatment.

4. The method of manufacturing a starch product of the class specified which comprises subjecting acidulated starch, in moist but solid or semi-solid condition, to heat and agitation under pressure maintained at less than that of the atmosphere.

5. The method of manufacturing a starch product of the class specified which comprises subjecting acidulated starch, in moist condition, to heat and agitation under pressure maintained at less than that of the atmosphere.

6. The method of manufacturing a starch product of the class specified which comprises mixing starch and an acid with water in sufficient amount to produce a liquid mixture, then removing a considerable quantity of the liquid content, and subjecting the starch to heat and agitation in an inclosed space from which the air and vapors are continuously exhausted.

7. The method of manufacturing a starch product of the class specified which comprises mixing starch and an acid with water in sufficient amount to produce a liquid mixture, then removing a considerable quantity of the liquid content by pressing, and subjecting the starch to heat and agitation in a vacuum of not less than twenty-five inches of mercury.

8. The method of manufacturing a starch product of the class specified which comprises mixing starch and an acid with water in sufficient amount to produce a liquid mixture, subjecting the mixture to a pressing operation which reduces it to a solid or semi-solid state, and modifying the starch in this state by subjecting it to heat and agitation.

9. The method of manufacturing a starch product of the class specified which comprises mixing starch and an acid with water in sufficient amount to produce a liquid mixture, subjecting the mixture to a pressing operation which reduces it to a solid or semi-solid state, and subjecting the starch in this state to heat and agitation in a vacuum, and continuously exhausting the vapor as formed so as to maintain the vacuum.

10. The method of manufacturing a starch product of the class specified which comprises mixing starch and an acid with water in sufficient amount to produce a liquid mixture, subjecting the mixture to a pressing operation which reduces it to a solid or semi-solid state, and subjecting the starch in this state to heat and agitation under a pressure maintained at less than atmospheric pressure.

11. The method of manufacturing a starch product of the class specified which comprises mixing starch with acid in a relatively large volume of water heated to approximately one hundred degrees Fahrenheit, removing a considerable quantity of the liquid content by pressing, and subjecting the material to heat and agitation in a vacuum.

12. The method of manufacturing a starch product of the class specified which comprises subjecting acidified starch in moist but solid or semi-solid condition to heat in a vacuum and removing the vapors as formed to maintain the vacuum, and thereafter breaking the vacuum and allowing the vapors to remain in contact with the material while the heating operation proceeds.

13. The method of manufacturing a starch product of the class specified which consists in producing a homogeneous mixture of starch, acid and water, the latter in volume sufficient to make the mixture substantially liquid, reducing the liquid content of the mixture by pressing, and subjecting the material while moist but in a relatively solid state, to heat in a vacuum and first drawing off the vapors as formed to maintain the vacuum, and thereafter breaking the vacuum and allowing the vapors to remain in contact with the material while continuing the application of heat.

14. The method of manufacturing a starch product of the class specified which comprises subjecting the starch in a solid or semi-solid state, acidulated and with a moisture content of more than twenty per cent., to heat in a vacuum of substantially not less than twenty-five inches measured on the mercury scale.

15. The method of manufacturing a starch product of the class specified which comprises subjecting the starch in a solid or semi-solid state, acidulated and with a moisture content of more than twenty per cent., to heat in a vacuum of substantially not less than twenty-five inches measured on the mercury scale, and when the product has a fluidity of approximately ninety degrees, breaking the vacuum and continuing the application of heat under atmospheric pressure to produce a further modification of the starch.

16. The method of making a starch product of the class specified which comprises heating starch in a moist state first at a pressure lower than atmospheric pressure and thereafter at a higher pressure.

17. The method of making a starch product of the class specified which comprises heating acidulated starch in a moist state first at a pressure lower than atmospheric pressure and thereafter at a higher pressure.

18. The method of making a starch product of the class specified which comprises heating starch in a moist but solid or semi-solid state first at a pressure lower than atmospheric pressure and thereafter at a higher pressure.

19. The method of making a starch product of the class specified which comprises heating starch in a moist state first in a vacuum and thereafter under atmospheric pressure.

20. The method of making a starch product of the class specified which comprises heating acidulated starch in a moist but solid or semi-solid state first in a vacuum and thereafter under atmospheric pressure.

21. The method of making a starch product of the class specified which comprises forming a fluid mixture of starch, water and acid, reducing the mixture to a solid or semi-solid state and heating the same first in a vacuum sufficient to prevent gelatinization and after a part of the moisture has been removed at a higher pressure.

22. The method of making a starch product of the class specified which comprises forming a fluid of starch, water and acid, subjecting the mixture to a pressing operation to reduce the liquid content, and heating the same first in a vacuum sufficient to prevent gelatinization and after a part of the moisture has been removed at a higher pressure.

23. The method of making a starch product of the class specified which comprises forming a fluid or semi-fluid mixture of undried table starch, water and acid, reducing the mixture to a solid or semi-solid state and heating the same first in a vacuum sufficient to prevent gelatinization and, after a part of the moisture has been removed, at a higher pressure.

24. The method of making a starch product of the class specified which consists in acidifying starch milk, then eliminating a considerable portion of the moisture therefrom without producing any appreciable modification of the starch to reduce the material to a moist but solid or semi-solid state, subjecting the material in this state to heat at a non-gelatinizing temperature to obtain a partial modification of the starch and the elimination of more of the moisture, and finally heating the material at a higher temperature to complete the modification of the starch and eliminating additional moisture.

25. The method of making a starch product of the class specified which consists in heating starch mixed with acid and water sufficient to make it thoroughly wet but in a solid state, keeping the same in constant movement to equalize the application of heat thereto and removing the vapors as formed to modify the starch and at the same time to dry it.

26. The method of making a starch product of the class specified which consists in heating starch mixed with acid and water sufficient to make it thoroughly wet but in a solid state, keeping the same in constant movement to equalize the application of heat thereto, removing the vapors as formed to modify the starch and at the same time to dry it and thereafter keeping the developed vapors in contact with the material while continuing the application of heat.

27. The method of manufacturing a product of the class specified which consists in heating starch mixed with acid and water to give it substantially the consistency of starch from the settling tables and removing the vapors as formed to modify the starch and at the same time to dry it to have substantially the normal moisture content of the product as ordinarily marketed.

28. The method of manufacturing a product of the class specified which consists in heating starch mixed with acid and water to give it substantially the consistency of starch from the settling tables, removing the vapors as formed to modify the starch and at the same time to dry it and thereafter keeping the developed vapors in contact with the material while continuing the application of heat whereby the product is dextrinized and will have substantially the normal moisture content of the product as ordinarily marketed.

29. The method of manufacturing a starch product of the class specified which consists in forming a mixture of starch, acid and water, heating the same at a sub-gelatinizing temperature and pressure while keeping it in constant movement to equalize the application of heat to modify the starch and at the same time to dry it.

30. The method of manufacturing a starch product of the class specified which consists in heating the starch mixed with acid and water at a pressure maintained at less than atmospheric pressure to modify the starch and reduce the moisture content thereof to approximately the normal moisture content of the product as ordinarily marketed.

31. The method of manufacturing a starch product of the class specified which consists in heating the starch mixed with acid and water first at a pressure maintained at less than atmospheric pressure and then at a higher pressure with the developed vapors in contact with the material to modify the starch and reduce the moisture content to substantially the normal moisture content of the product as ordinarily marketed.

ADOLPH W. H. LENDERS.